(12) United States Patent
Fretz et al.

(10) Patent No.: US 8,605,927 B2
(45) Date of Patent: Dec. 10, 2013

(54) HEARING AID POSITIONING SYSTEM AND STRUCTURE

(75) Inventors: Robert J. Fretz, Maplewood, MN (US); Jean Elvira Daavettila, St. Paul, MN (US); Christopher Drake Conger, Stillwater, MN (US); Vincent Joseph Mako, Lakeville, MN (US)

(73) Assignee: IntriCon Corporation, Arden Hills, MN (US)

( * ) Notice: Subject to any disclaimer, the term of this patent is extended or adjusted under 35 U.S.C. 154(b) by 78 days.

(21) Appl. No.: 13/245,974

(22) Filed: Sep. 27, 2011

(65) Prior Publication Data

US 2012/0076336 A1  Mar. 29, 2012

Related U.S. Application Data

(63) Continuation-in-part of application No. 12/895,012, filed on Sep. 30, 2010.

(60) Provisional application No. 61/386,953, filed on Sep. 27, 2010, provisional application No. 61/472,179, filed on Apr. 5, 2011.

(51) Int. Cl.
H04R 25/00 (2006.01)

(52) U.S. Cl.
USPC ........... 381/328; 381/312; 381/322; 381/323; 381/329

(58) Field of Classification Search
USPC ......... 381/323, 312, 322, 324, 328–329, 314, 381/380
See application file for complete search history.

(56) References Cited

U.S. PATENT DOCUMENTS

| | | | |
|---|---|---|---|
| 1,668,890 A | 5/1928 | Curran et al. | |
| 3,312,789 A | 4/1967 | Lewis et al. | |
| 3,676,611 A | 7/1972 | Stephens | |
| 4,291,203 A | 9/1981 | Bellafiore | |
| 4,375,016 A | 2/1983 | Harada | |
| 4,870,688 A | 9/1989 | Voroba et al. | |
| 5,048,090 A | 9/1991 | Geers | |
| 5,201,007 A | 4/1993 | Ward et al. | |
| 5,275,596 A | 1/1994 | Long et al. | |
| 5,381,484 A | 1/1995 | Claes et al. | |
| 5,717,771 A | 2/1998 | Sauer et al. | |
| 6,035,961 A | 3/2000 | Sun | |
| 6,516,074 B1 | 2/2003 | Brimhall et al. | |
| 6,819,762 B2 * | 11/2004 | Jones et al. | 379/430 |
| 7,025,061 B2 | 4/2006 | Haussmann | |

(Continued)

OTHER PUBLICATIONS

Surefire, Earpieces Fitting Sheet, Jan. 2008, published online at www.surefire.com.

*Primary Examiner* — Brian Ensey
*Assistant Examiner* — Sabrina Diaz
(74) *Attorney, Agent, or Firm* — Shewchuk IP Services, LLC; Jeffrey D. Shewchuk

(57) ABSTRACT

A hearing aid includes a relatively rigid shell which holds hearing aid electronics and one or more flexible, shape-retaining filaments attached to the hearing aid shell. The filament(s) extend(s) out a proximal side of the hearing aid shell having a shape which interacts with the user's ear anatomy such as the conchae bowl. The shape determines an insertion depth of the hearing aid shell into the user's ear canal, and a spring action biases the hearing aid toward the desired insertion depth. The hearing aid supported by the filament(s) provides an open, unoccluding position in the ear canal.

22 Claims, 6 Drawing Sheets

(56) References Cited

U.S. PATENT DOCUMENTS

| | | |
|---|---|---|
| 7,068,803 B2 | 6/2006 | Kuhlmann et al. |
| 7,394,910 B2 | 7/2008 | Smith et al. |
| 7,421,086 B2 * | 9/2008 | Bauman et al. ............... 381/328 |
| 7,564,989 B2 | 7/2009 | Schanz |
| 7,778,435 B2 | 8/2010 | Smith et al. |
| 2005/0190939 A1 | 9/2005 | Fretz |
| 2006/0023908 A1 | 2/2006 | Perkins et al. |
| 2006/0067556 A1 | 3/2006 | Bailey et al. |
| 2006/0147072 A1 | 7/2006 | Sodoma et al. |
| 2007/0280496 A1 | 12/2007 | Karamuk et al. |
| 2008/0205679 A1 | 8/2008 | Darbut et al. |
| 2009/0092269 A1 * | 4/2009 | Nielsen et al. ................ 381/313 |
| 2011/0182454 A1 * | 7/2011 | Larsen et al. ................ 381/328 |

* cited by examiner

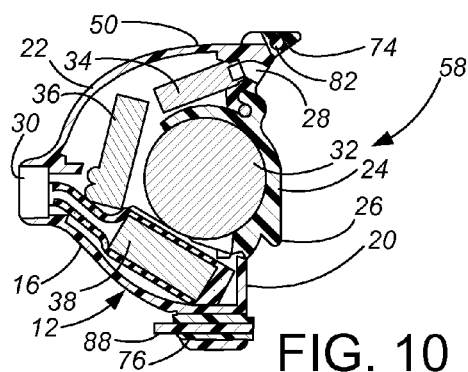
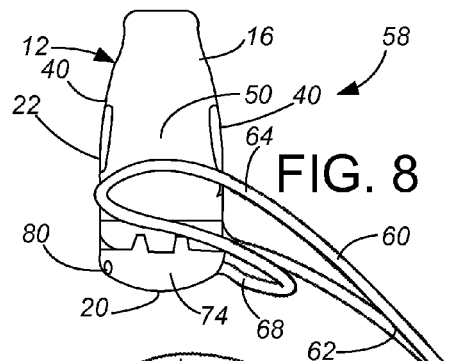
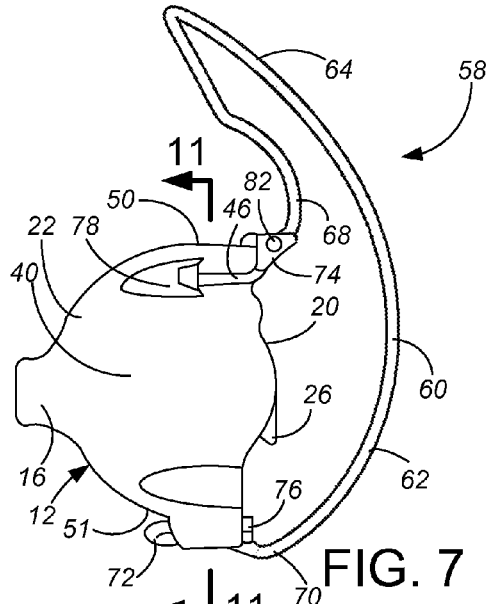
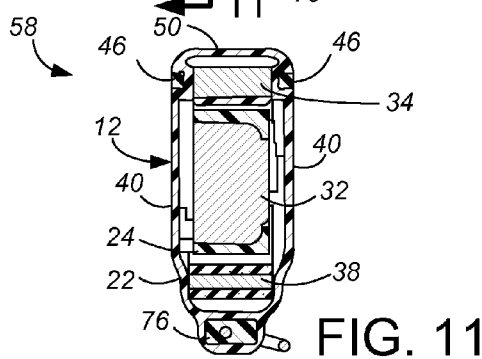
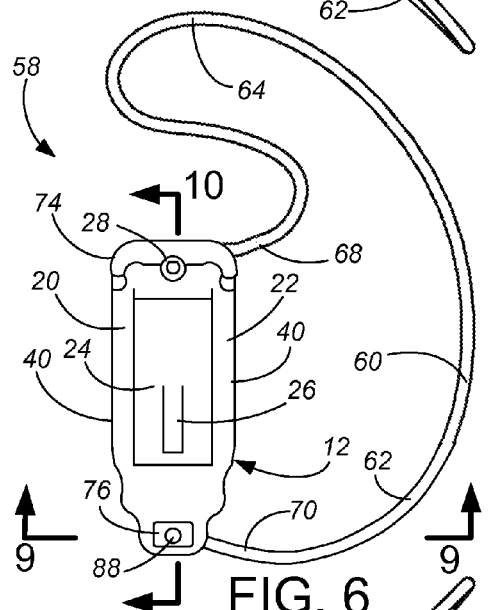
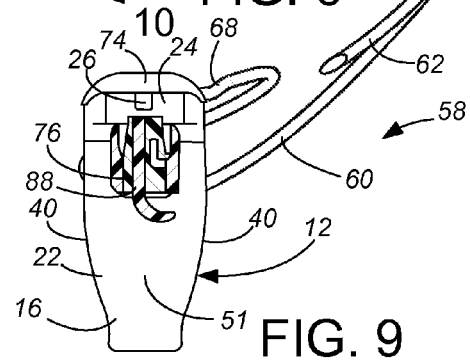

HEARING AID POSITIONING SYSTEM AND STRUCTURE

CROSS-REFERENCE TO RELATED APPLICATION(S)

The present application claims the benefit of U.S. provisional patent application Ser. No. 61/386,953, filed Sep. 27, 2010 and of U.S. provisional patent application Ser. No. 61/472,179, filed Apr. 5, 2011. The present application claims also claims priority to U.S. patent application Ser No. 12/895,012 filed Sep. 30, 2010. The contents of U.S. provisional patent application Ser. No. 61/386,953, U.S. provisional patent application Ser. No. 61/472,179 and U.S. patent application Ser No. 12/895,012 are hereby incorporated by reference in entirety.

BACKGROUND OF THE INVENTION

The present invention relates to hearing aids. In particular, the present invention pertains to systems and structures for correctly and consistently locating hearing aids relative to the ear anatomy of a user.

Hearing aids on the market today are available in different mounting configurations. Many hearing aids include a behind-the-ear ("BTE") portion which, as the name implies, is mounted behind the user's ear, with the ear supporting the weight of some or all the hearing aid components, including primarily the weight of the battery and amplifier and associated housing. Many BTE hearing aids include a sound tube which extends into the user's ear canal. Other hearing aids are considered in-the-ear ("ITE") hearing aids with some or all of the weight of the hearing aid supported in the conchae bowl of the user's ear. Many hearing aids also include a portion which resides in the user's ear canal, including receiver-in-canal ("RIC") hearing aids which have only the receiver of the hearing aid in the ear canal, in-the-canal ("ITC") hearing aids which extend largely into the ear canal for support but include a portion outside the ear canal, or completely-in-canal ("CIC") hearing aids which reside entirely in the user's ear canal. Some ITC and CIC hearing aids have used a flexible retrieval line for removing the hearing aid from the ear canal.

Hearing aid placement is important for best sound quality and best comfort of the hearing aid. For BTE and ITE hearing aids, the location is driven mostly by comfort and aesthetics. Aesthetically, most users desire a hearing aid which is as inconspicuous as possible. Because sound quality is somewhat dependent upon proximity of the hearing aid's sound outlet to the eardrum, placement (depth of canal insertion) affects sound quality more heavily in ITC and CIC hearing aids.

Part of the difficulty in designing hearing aids is that the anatomical shapes of different users' ears are not uniform. To achieve accurate and consistent placement in the desired location relative to a user's eardrum, many hearing aids use a custom shell which is custom shaped to fit that particular user's shape of ear anatomy. However, customization of the shell involves significant costs which can be avoided with a less customized solution.

For many RIC, ITC and CIC non-custom hearing aids, placement is largely set by the user, i.e., the user pushes the hearing aid (or canal portion) into the ear canal sufficiently far that it comfortably seats in a desired ear canal location by biasing off the wall of the ear canal. A large part of the consistent placement of such RIC, ITC and CIC non-custom hearing aids relies on the gradually decreasing diameter of the ear canal, i.e., the user pushes the hearing aid into the canal until it feels snug but not overly tight. As more hearing aid solutions become available, proper placement methods for non-custom hearing aids that do not rely on "snugness" in the ear canal are needed.

BRIEF SUMMARY OF THE INVENTION

The present invention is a hearing aid and a system and method for supporting and securing the hearing aid relative to a user's ear canal. The hearing aid has a hearing aid shell with hearing aid electronics therein. One or more flexible, shape-retaining filaments are attached to the hearing aid shell, and extend out a proximal side of the hearing aid shell to interact with the user's ear anatomy such as the conchae bowl. The shape of the filaments provide both a stop which determines an insertion depth of the hearing aid shell into the user's ear canal, and a biasing structure to bias the hearing aid into the ear canal and bias the stop against the user's ear skin, and preferably also to support the weight of the hearing aid for an open, unoccluding position in the ear canal.

BRIEF DESCRIPTION OF THE DRAWINGS

FIG. 6 is an end view of the hearing aid of FIGS. 3-5.

FIG. 7 is a side view of the hearing aid of FIGS. 3-6.

FIG. 8 is a top view of the hearing aid of FIGS. 3-7.

FIG. 9 is a cross-sectional bottom view, taken along lines 9-9 is FIG. 6.

FIG. 10 is a cross-sectional side view, taken along lines 10-10 in FIG. 6.

FIG. 11 is a cross-sectional end view, taken along lines 11-11 in FIG. 7.

While the above-identified drawing figures set forth preferred embodiments, other embodiments of the present invention are also contemplated, some of which are noted in the discussion. In all cases, this disclosure presents the illustrated embodiments of the present invention by way of representation and not limitation. Numerous other minor modifications and embodiments can be devised by those skilled in the art which fall within the scope and spirit of the principles of this invention.

DETAILED DESCRIPTION

Figure 1:
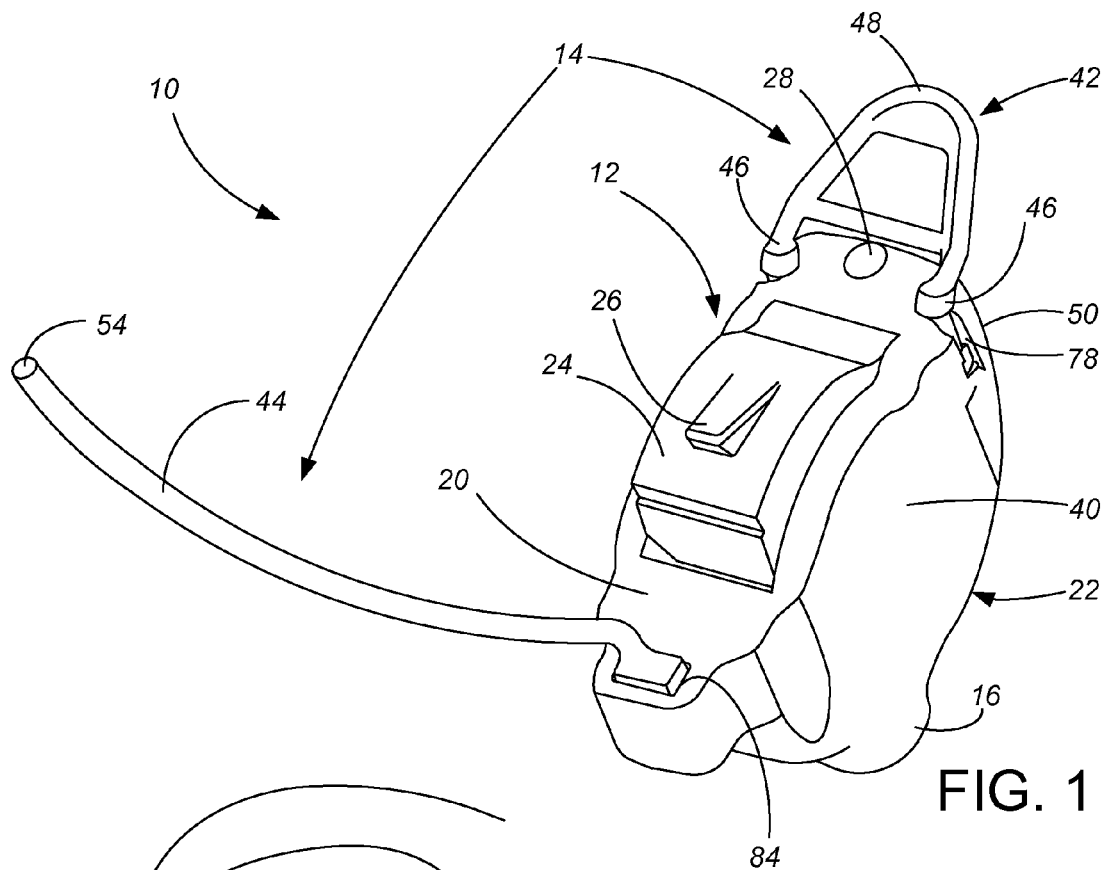
FIG. 1 is a perspective view of a hearing aid using a first embodiment of the positioning system and structure of the present invention, for use in a right ear.
Figure 2:
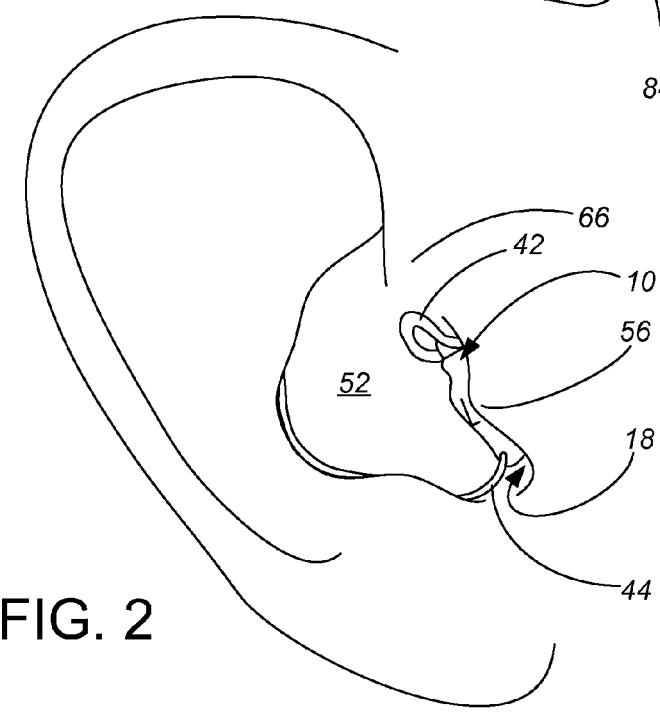
FIG. 2 illustrates placement of the hearing aid of FIG. 1 in a user's right ear.
Figure 3:
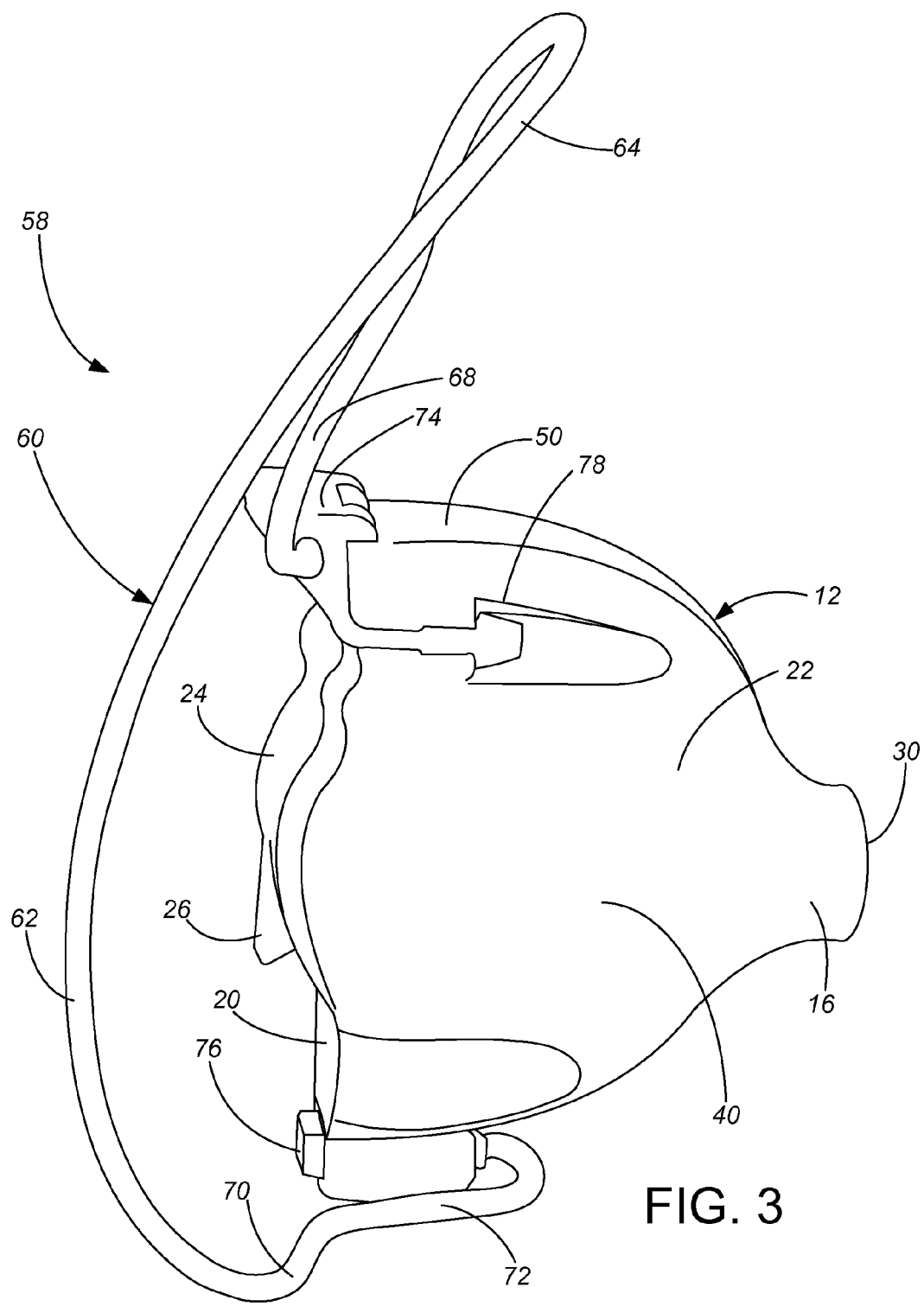
FIG. 3 is a perspective view of the hearing aid of FIG. 1 using a second embodiment of the positioning system and structure of the present invention, for use in a left ear.
Figure 4:
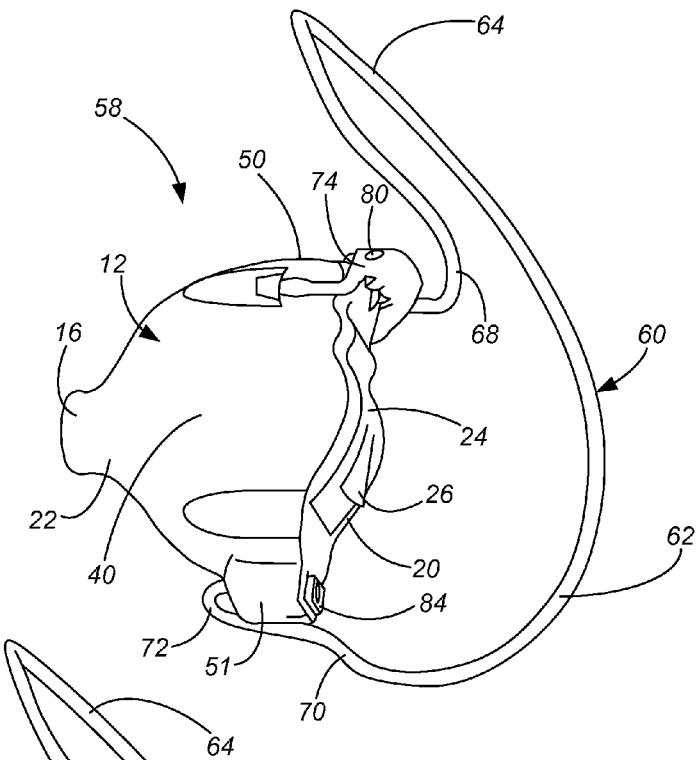
FIG. 4 is an opposite side perspective view of the hearing aid of FIG. 3.
Figure 5:
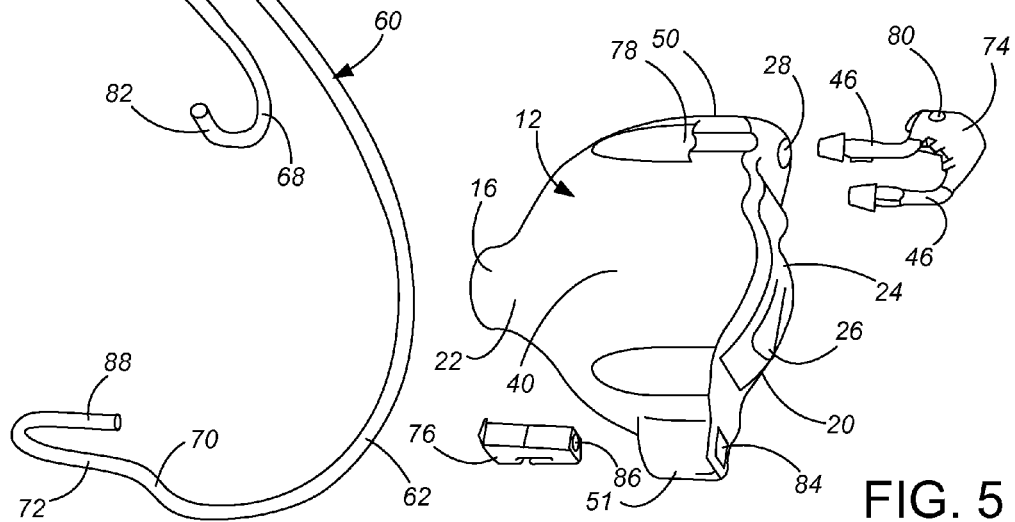
FIG. 5 is an assembly view corresponding to FIG. 4.

FIGS. 1 and 2 show a first embodiment of the present invention. A hearing aid 10 includes a hearing aid housing 12 and a positioning structure 14. The housing 12 includes one end 16 which projects into the ear canal 18 and another side 20 which faces out of the ear canal 18. As depicted, the housing 12 is in the shape of the APT hearing aid available from IntriCon Corporation of Arden Hills, Minn., but other shapes of housings could alternatively be used. The housing 12 includes a shell 22 and a battery door 24, and in this embodiment the battery door 24 is on the outwardly facing side 20 of the hearing aid 10. The battery door 24 hinges open and closed, and in this embodiment includes a projecting fingernail tab 26 for the user to more easily manipulate the battery door 24 between open and closed positions. A microphone port opening 28 is provided on the outwardly facing side 20 of the shell 22. A sound exit port 30 (shown in FIG. 10) is provided on the inwardly projecting end 16. A wax guard (not shown) may optionally cover the sound exit port 30.

The shell 22 contains the primary electrical components of the hearing aid 10. As best shown in FIG. 10, the primary electrical components include a power source such as a hearing aid battery 32, a microphone 34 which converts received sound into an electrical signal, sound processing circuitry 36 which may include a digital sound processing chip, and a speaker 38 (commonly called a "receiver" in the hearing aid industry) which converts the processed electrical signal into sound output. The housing 12 can be molded out of a hard plastic material acceptable for skin contact, which can be transparent or colored as desired to match the user's skin tone and ear shadowing. The housing 12 is sufficiently thick that it is generally rigid during use and does not significantly deflect during contact with the ear canal 18, and such that the housing 12 protects the electrical components 32, 34, 36, 38 housed therein. For instance, in the preferred embodiment the shell 22 and battery door 24 are molded out of TROGAMID polyamide with a smooth textured finish without witness lines. As known in the hearing aid art, many other materials can be alternatively used for the hearing aid housing 12.

The preferred housing 12 is not custom shaped and is intended not to closely match the geometry of the user's ear canal 18. Instead, the preferred housing 12 is generally rectangular in vertical cross-section transverse to the insertion direction (such as shown in FIG. 11), i.e., taller than it is wide, such that the sides 40 of the housing 12 are well spaced from the ear canal walls and provide an open, unoccluded feel to the hearing aid 10.

As shown in FIGS. 1 and 2, the positioning structure 14 of this embodiment includes two separate components: an ear canal depth positioning structure 42 at the top of the hearing aid housing 12 and a height and insertion biasing structure 44 at the bottom of the hearing aid housing 12. In this preferred embodiment, the ear canal depth positioning structure 42 is generally in the shape of a horseshoe, attached at two ends 46 to the hearing aid shell 22 and providing an upwardly extending curve portion 48. As best shown in FIG. 2, the hearing aid 10 is inserted into the user's ear canal 18 until the upwardly extending curve 48 contacts and biases off the conchae bowl skin immediately above the entrance to the ear canal 18. For ease of discussion, the ear canal depth positioning structure will be referred to as a "horseshoe" stop 42, even though many of the functions of the ear canal depth positioning structure could be alternatively obtained by a shape which was not a horseshoe.

The dimensions of the ear canal depth positioning structure 42 affect its use. In the preferred embodiment, the horseshoe stop 42 presents a notch in the overall exterior shape of the top of the hearing aid 10 which prevents the top 50 of the hearing aid shell 22 from being placed too deep into the ear canal 18. If the top 50 of the hearing aid shell 22 is viewed as presenting a relatively smooth "slide" surface for sliding along the top skin of the ear canal 18 during insertion, the horseshoe stop 42 must be at an angle to the smooth "slide" direction and must project noticeably above the smooth "slide" surface 50. In the preferred embodiment, the horseshoe stop 42 defines an angle of about 105° relative to the smooth "slide" surface 50 (e.g., relative to horizontal as depicted in the figures). By presenting a relatively flat 105° profile and due to the fact that there are no exposed ends or sharp corners on the horseshoe stop 42, the horseshoe stop 42 provides minimal irritation or tickling of the ear skin. In the preferred embodiment, the height of the uppermost end of the curve 48 is about 0.15 inches higher than the smooth "slide" surface 50. This 0.15 inch notch does a good job of tactilely informing the hearing aid user of a proper seating position for the hearing aid 10 when the horseshoe stop 42 contacts the ear tissue above the ear canal 18. For the preferred hearing aid housing 12, this places the uppermost end of the curve 48 about 0.41 inches higher than the sound outlet port 30, and about 0.44-0.49 inches lengthwise from the sound outlet port 30 (e.g., the sound outlet port 30 is at most 0.44-0.49 inches lengthwise from where the horseshoe stop 42 contacts the skin. To a limited extent, the length of the horseshoe stop 42 extending away from the shell 22 also provides a retrieval line for extraction of the hearing aid 10 from the ear canal 18.

The horseshoe stop 42 preferably attaches on opposite sides of the hearing aid shell 22, such that the horseshoe stop 42 has a width which matches the width of the hearing aid shell 22. By having this width, the horseshoe stop 42 provides stability for the proper orientation of the hearing aid 10, and specifically prevents the hearing aid 10 from twisting on a vertical axis.

If desired, the horseshoe stop 42 can attach to the hearing aid shell 22 with a snap fit, such that the horseshoe stop 42 can be readily removed and replaced, including being replaced with a different size of horseshoe stop 42 to better match the wearer's ear geometry. For instance, a "tall" horseshoe stop can have the sound outlet port 30 slightly further into the ear canal 18 (such as an insertion depth of 0.49 inches) than a "short" horseshoe stop (providing the 0.44 inch insertion depth). For some very small canal anatomies, the interaction between the top 50 and bottom 51 of the housing 12 and the top and bottom of the canal 18 may control the depth of insertion into the canal 18, and the removable horseshoe stop 42 can be removed and discarded.

The preferred hearing aid housing 12 and horseshoe stop 42 are bilaterally symmetrical. By having bilateral symmetry, the hearing aid housing 12 and horseshoe stop 42 fit equally well in both left and right ears, requiring no variation between use in either the left or the right ear.

The biasing structure 44 is received in the user's conchae bowl 52 and extends around the conchae bowl 52. The biasing structure 44 is intended to provide four primary functions. Firstly, the biasing structure 44 provides a slight inward biasing force on the hearing aid housing 12, to keep the horseshoe stop 42 biased against the skin and so the hearing aid 10 does not work itself out of the desired position in the ear canal 18 even if the wearer has quick head motions or is exercising. Secondly, the biasing structure 44 positions the insertion depth of the bottom side of the hearing aid shell 22, preventing the bottom of the hearing aid shell 22 from being placed too far into the canal 18 or from being placed too far out of the canal 18. Thirdly, the biasing structure 44 somewhat supports the weight of the hearing aid 10, so the hearing aid 10 has minimal or no contact with the bottom surface of the ear canal 18. By keeping the receiver 38 and surrounding housing 12 from contacting the bottom canal wall, the biasing structure 44 produces a larger gap around the hearing aid housing 12 for an unoccluded, open and non-irritating feel and performance. Finally, the biasing structure 44 provides a retrieval line for removing the hearing aid 10 from the ear canal 18.

In this embodiment, the biasing structure 44 has a free end 54 which is not attached to the hearing aid housing 12, but rather rests in the wearer's conchae bowl 52 during use of the hearing aid 10. By having a free end 54, the length of the biasing structure 44 works equally well with a wide variety of conchae bowl 52 shapes and sizes, i.e., the length of the biasing structure 44 does not have to be selected to exactly match the size of the wearer's conchae bowl 52, but instead wraps around the conchae bowl 52 a different amount for different sized ears.

In most ear anatomies, the conchae bowl 52 defines a generally vertical plane at a significant non-perpendicular angle relative to the ear canal 18, enough so that the preferred embodiment uses either right or left biasing structures which extend out of the hearing aid housing 12 in opposite right or left directions. In the preferred embodiment, the end 54 of the biasing structure 44 is offset about 0.15 to 0.50 inches to the left (for right ear insertion) or right (for left ear insertion) of the bisecting plane. To bias smoothly against the opposing wall of the conchae bowl 52, the end 54 of the preferred biasing structure 44 is about 0.9 inches from the battery door end 20 of the hearing aid housing 12. The curling of the biasing structure 44 to fit the wrap of the conchae bowl 52 causes a spring action which biases the hearing aid shell 10 into the ear canal 18.

The horseshoe stop 42 and biasing structure 44 thus individually and in concert provide benefits by causing the hearing aid housing 12 to be placed at a proper insertion depth so the receiver 38 and surrounding housing 12 are less likely to come into contact with the canal wall and so there is more room for sound to travel around the hearing aid shell 22. An additional result is that the hearing aid 10 is sufficiently hidden and is aligned with the shape of the tragus 56 which provides a more consistent and appealing appearance.

The horseshoe stop 42 and the biasing structure 44 are preferably both formed of a filament of material which is both flexible and somewhat shape retaining. In the preferred embodiment, both the horseshoe stop 42 and the biasing structure 44 are formed of PEBAX polyether block amide (6333 SA 01, 6333 SA 01 MED or 7033 SA 01 MED available from Arkema Technical Polymers of Colombes, France), which can be cut and bent into the desired shape. When formed of this material, the filament has a thickness in the range of 0.02-0.04 inches, with a preferred thickness at a 0.024 inch diameter The horseshoe stop 42 and the biasing structure 44 could alternatively be molded of nylon (such as nylon 11 or nylon 12) or a similar polymer (possibly TROGAMID polyamide) into the desired shape, at a thickness which provides the desired flexibility. If formed of the same material, the thickness of the filament is thinner than the wall thickness of the housing 12. By being flexible, the filament material can deflect a distance greater than its thickness due to pressure from the skin of the conchae 52 without causing discomfort or pain to the wearer. By being shape retaining, the filament material can support its own weight in a desired configuration, and curves and bends can be strategically placed into the filament material. In the preferred configuration, the cross-sectional shape of the filament is round, but the filament cross-section could be oblong or could vary along its shape, particularly depending upon the material and stiffness desired.

The preferred materials for the horseshoe stop 42 and the biasing structure 44 are transparent or translucent, so the flexible filament blends as much as possible with the coloring and shadowing of the user's ear skin folds. Alternatively, the flexible filament could be formed of an opaque material colored to match the general coloring of the user's skin.

A second embodiment of a hearing aid 58 in accordance with the present invention, again showing the preferred shape of the APT hearing aid shell 22, is shown in FIGS. 3-12. In this embodiment, both the horseshoe stop 42 and the biasing structure 44 are combined into a single D-ring filament 60. The D-ring filament 60 includes a cavum conchae portion 62 and a cimba conchae portion 64, with the cimba conchae portion 64 in use extending into the crevice above the user's radix helices 66 (shown in FIG. 2). The D-ring 60 connects to the hearing aid housing 12 with an upper depth setting bend 68. Similar to one of the functions of the horseshoe stop 42, the upper depth setting bend 68 provides a stop which the user intuitively uses to determine how far to insert the hearing aid housing 12 into the ear canal 18. The cavum conchae portion 62 provides the primary biasing force to keep the hearing aid 58 seated in the user's ear canal 18 with the upper depth setting bend 68 in contact with the skin just above the ear canal 18.

Beneath the cavum conchae portion 62, the D-ring 60 includes a lower depth setting bend 70 and an ear canal reverse loop 72. The lower depth setting bend 70 determines how far the lower side of the hearing aid housing 12 should be inserted in the ear canal 18, and together with the upper depth setting bend 68 keep the hearing air with its longitudinal axis directed parallel to the longitudinal axis of the ear canal 18. The ear canal reverse loop 72 can make contact against the skin of the bottom of the ear canal 18 to help raise the hearing aid housing 12 in the ear canal 18. The ear canal reverse loop 72 also helps to provide strain relief when the D-ring 60 is used as a retrieval line for the hearing aid 58, making it less likely that the filament will pull away from its attachment to the hearing aid housing 12 during removal of the hearing aid 58 from the ear canal 18.

In this embodiment, the D-ring filament 60 is attached to the hearing aid shell 22 with a top clip 74 and a bottom clip 76. The top clip 74 mates into the side openings 78 with a snap fit. The top clip 74 includes a transversely extending filament attachment hole 80, and the end 82 of the filament 60 can be threaded into the filament attachment hole 80 and held in place such as with glue (such as LOCTITE 4310 light cure adhesive flashcure cyanoacrylate)(not shown). The top clip 74 may extend partially around the top surface 50 of the shell 22 to better hold itself in place by the side openings 78.

Similarly, the bottom clip 76 mates into a bottom socket 84 in the shell 22 with a snap fit. The bottom clip 76 includes a longitudinally extending filament attachment hole 86, and the end 88 of the filament 60 can be threaded into the filament attachment hole 86 and held in place such as with glue (not shown).

Both the top clip 74 and the bottom clip 76 can be molded out of a suitable polymer material, such as TROGAMID polyamide or a 35% glass filled nylon 6/6. As an alternative to using top and bottom clips 74, 76 to attach the D-ring filament 60 to the hearing aid shell 22, all three structures could be joined in a single molded piece. As an additional example, the embodiment shown in FIG. 12 combines the top clip into the horseshoe stop 42. In this embodiment, both the horseshoe stop 42 and the biasing structure 44 are combined into a single D-ring filament 60. As another example, FIG. 13 shows an embodiment in which both the top clip 74 and the bottom clip 76 attach into the hearing aid shell 22 from the side.

Figure 12:
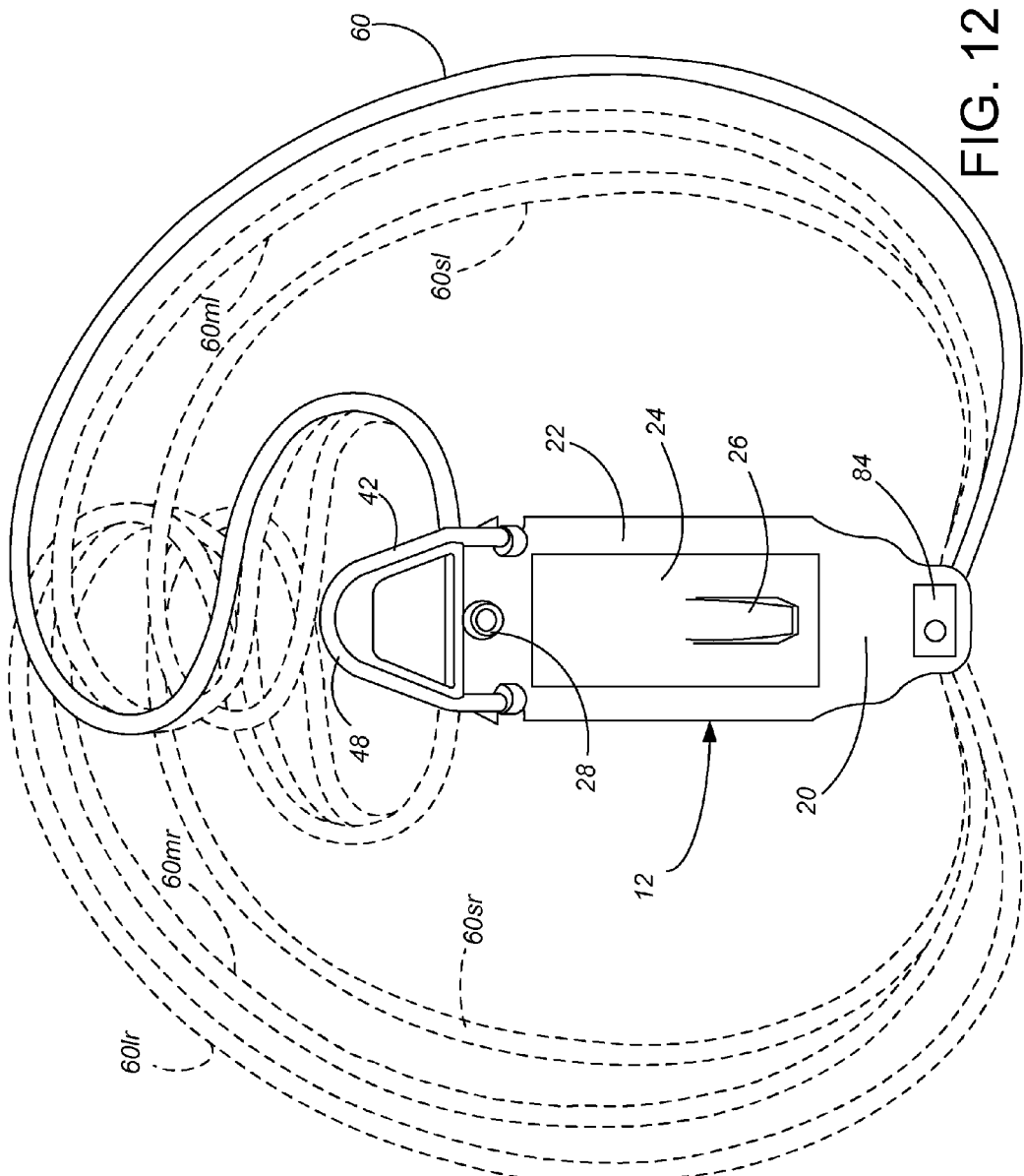
FIG. 12 is an end view, showing a comparison of different sizes and different right/left ear configurations of the positioning system and structure of the second embodiment of the present invention.
Figure 13:
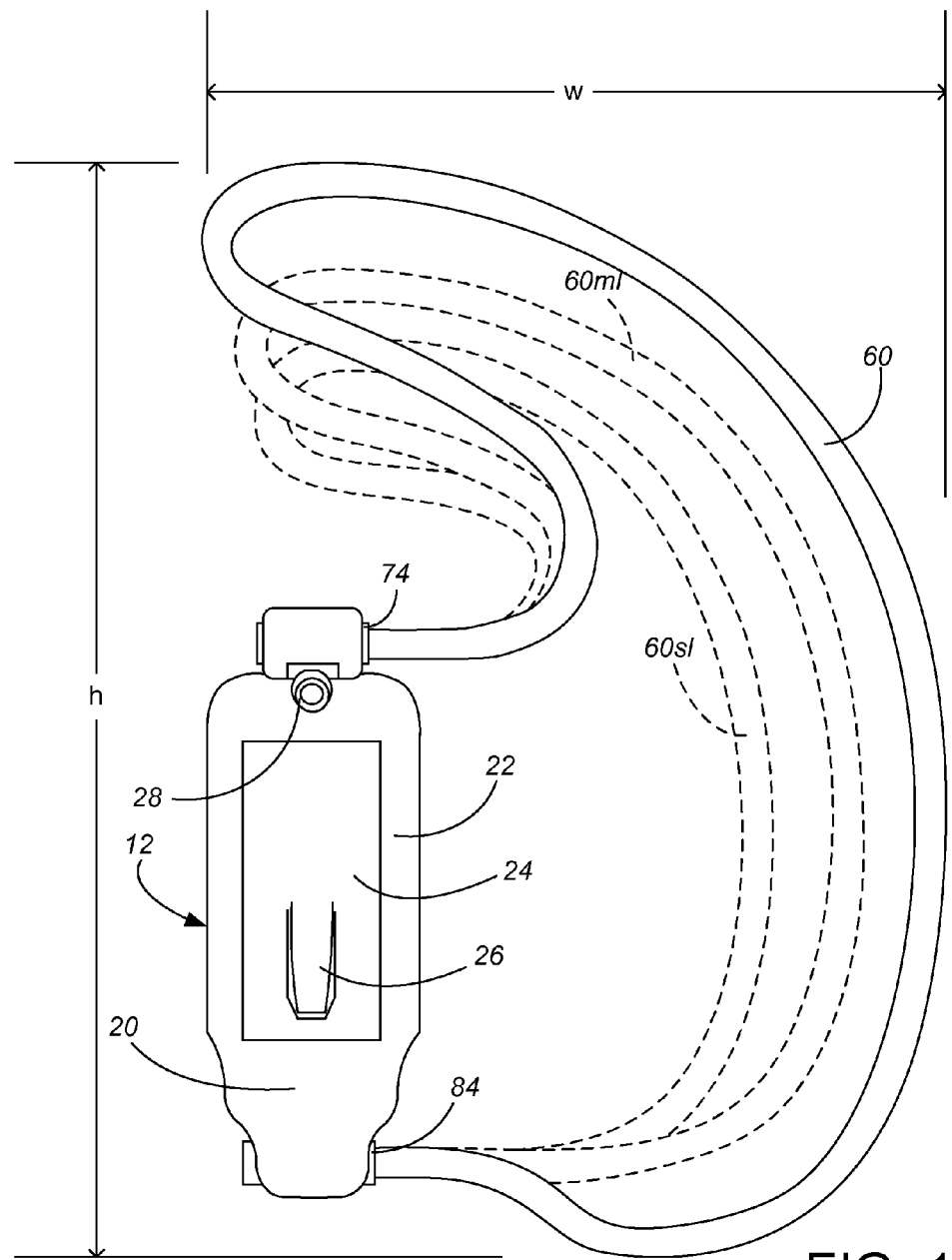
FIG. 13 is an end view, showing a comparison of different sizes of a third embodiment of the present invention.

The filament material can be made into right hand and left hand versions of D-ring filaments 60 and with different sizes as depicted in FIGS. 12 and 13. In FIG. 12, the small and medium sizes of the left D-ring filament 60*sl*, 60 ml are shown in dashed lines, as are all three sizes of the right D-ring filament 60*sr*, 60*mr*, 60*k*. In FIG. 13, only the left ear versions

60, 60*ml*, 60*sl*** are shown. Each of the top clip 74 and bottom clip 76 are removable from the hearing aid shell 22, which allows changing of different sizes, shapes or orientations of the filament 60 attached to the hearing aid housing 12. By having the filaments 60 be readily attachable and detachable from the hearing aid shell 22, a single hearing aid electronic/housing unit can be provided as part of a kit with a number of different configurations of flexible filaments 60, and the wearer can then be fitted so the hearing aid uses the flexible filament 60 having the size, shape, color, flexibility, etc. which best fits that particular user.

The dimensions of the D-ring filament 60 are selected to match a reasonable proportion of the population. For instance, the width w and height h dimensions of preferred D-ring filaments 60, 60*ml*, 60*sl* shown in FIG. 13 are as follows: small width 0.59 in, small height 0.88 in.; medium width 0.68 in., medium height 0.95 in.; large width 0.77 in, large height 1.14 in. The depth that the cavum conchae portion 62 trails the sound exit port 30 is preferably as follows: small 0.68 in., medium 0.74 in., large 0.84 in. The depth that the cimba conchae portion 64 trails the sound exit port is preferably as follows: small 0.29 in., medium 0.26 in., large 0.18 in.

Providing a kit with multiple shapes and/or sizes of positioning structures 14, 60 allow a fitting process to further select the best location for the housing 12 in the ear canal 18. The fitting goal is to provide a comfortable fit with a minimal amount of attenuation or occlusion, while providing a pleasing appearance. The ideal device placement is to position the proximal end 20 of the housing 12 slightly past the tragus 56, with the battery door 24 parallel to the tragus 56. The housing 12 should allow gaps between its broad sides 40 and the canal wall. The sound outlet port 30 should ideally not come in contact with any part of the canal wall but should be pointed down the canal 18 toward the ear drum. The housing 12 should not be visible from the front of the wearer, but may be slightly visible from the side of the wearer.

To install the horseshoe stop 42 or the upper attachment of the D-ring filament 60, the ends 46 are pushed over the housing 12 along the side openings 78. The ends 46 will be slightly spread until snapped into the side openings, which may be performed either with fingers or with a small pliers (not shown). When correctly installed, the ends 46 will be flush with the broad sides 40 of the housing 12. To install the biasing structure 44 or the lower attachment of the D-ring filament 60, the bottom clip 76 is snapped into the bottom socket 84 in the desired orientation.

Once the positioning structures 14, 60 are assembled to the housing 12, the hearing aid 10, 58 is placed in the ear canal 18 with the sound outlet port 30 pointed toward the ear drum. When the insertion depth is such that horseshoe stop 42 or upper depth setting bend 68 contacts the skin above the ear canal 18, the free end 54 of the biasing structure 44 or the cavum conchae portion 64 is pulled or pushed into the conchae bowl.

The shape retaining nature of the positioning structure 14, 60 allows a further fitting process to best select the best location for the housing 12 in the ear canal 18. The biasing structure 44 or the D-ring filament 60 can be custom bent to match the ear anatomy of the wearer. A tool (not shown) can be provide with a small hole to assisting in making small radius bends in the biasing structure 44 or the D-ring filament 60. For instance, the biasing structure 44 or the D-ring filament 60 can be bent to better match the angle of the ear canal 18 relative to the conchae bowl 52, or additional curling of the free end 54 may eliminate potential irritation with the ear.

The positioning structures 14, 60 of the present invention thus provide a simple and convenient structure to hold the hearing aid housing 12 in the desired open and unoccluding location in the entrance of the ear canal 18. By being both shape retaining and flexible, the positioning structures 14, 60 provide the positioning benefits without causing discomfort to the wearer. The positioning structures 14, 60 mate into ear anatomy in an unobtrusive and hidden way, minimizing the look of the hearing aid 10, 58. For a hearing aid 10, 58 supported in this manner, it is further beneficial if there are no switches on the hearing aid shell requiring manipulation by the user while the hearing aid 10, 58 is supported in the ear and being used. The ear contact pressure wave hearing aid switch of U.S. patent application Ser. No. 13/030,828 is particularly appropriate and incorporated by reference.

Although the present invention has been described with reference to preferred embodiments, workers skilled in the art will recognize that changes may be made in form and detail without departing from the spirit and scope of the invention.

What is claimed is:

1. A hearing aid comprising:
    a hearing aid shell with hearing aid electronics disposed therein, the hearing aid electronics including a power source, a microphone, a signal processor and a receiver, the receiver projecting a hearing aid amplified audio output out of a sound output port on a distal side of the hearing aid shell; and
    a flexible filament extending out of a proximal side of the hearing aid shell, the flexible filament extending outside the profile of the hearing aid shell, such that the filament interacts with a user's ear anatomy to determine an insertion depth of the hearing aid shell into the user's ear canal by preventing the hearing aid from being pushed too deep into the ear canal by the user, the flexible filament being shape retaining, wherein the flexible filament comprises an ear canal reverse loop for making contact against the skin of the bottom of the ear canal to help raise the hearing aid in the ear canal, the ear canal reverse loop extending distally in a direction toward the distal side of the hearing aid shell and then looping to extend proximally off the hearing aid shell.

2. The hearing aid of claim 1, wherein the flexible filament attaches to the hearing aid at a first lower position and at a second higher position on the proximal side of the hearing aid shell.

3. The hearing aid of claim 2, wherein the flexible filament attaches to the hearing aid shell with a top clip and a bottom clip, each of the top clip and bottom clip being removable from the hearing aid shell for changing of the flexible filament.

4. The hearing aid of claim 1, wherein the flexible filament projects upwardly and rearwardly off a top side of the hearing aid shell, wherein the flexible filament comprises an upper depth setting bend for determining the insertion depth of a top of the hearing aid shell into the ear canal by contacting skin above the entrance to the ear canal and thereby preventing the top side of the hearing aid shell from being pushed too deep into the ear canal by the user.

5. The hearing aid of claim 1, wherein the flexible filament comprises a cavum conchae portion for providing a primary biasing force to keep the hearing aid seated in the user's ear canal.

6. The hearing aid of claim 1, wherein the flexible filament comprises a lower depth setting bend for determining the insertion depth of a bottom of the hearing aid shell into the ear canal by contacting skin below the entrance to the ear canal and thereby preventing the bottom side of the hearing aid shell from being pushed too deep into the ear canal by the user.

7. The hearing aid of claim 1, wherein the flexible filament is transparent or translucent.

8. The hearing aid of claim 1, wherein
the outer surface of the hearing aid shell is dissimilar to the ear canal shape to provide openings between the hearing aid shell and the user's ear canal and thereby provide an unoccluded feel.

9. The hearing aid of claim 1, wherein the flexible filament is selected from a kit of flexible filaments having different sizes.

10. The hearing aid of claim 1, wherein a top of the hearing aid shell comprises a slide surface for sliding along the top skin of the ear canal during insertion, and wherein the flexible filament provides a notch in the overall exterior shape of the top of the hearing aid projecting at an angle to a slide direction and projecting above the slide surface.

11. A hearing aid comprising:
a hearing aid shell with hearing aid electronics disposed therein, the hearing aid electronics including a power source, a microphone, a signal processor and a receiver, the receiver projecting a hearing aid amplified audio output out of a sound output port on a distal side of the hearing aid shell, wherein a top of the hearing aid shell comprises a slide surface for sliding along the top skin of the ear canal during insertion; and
a flexible filament extending out of a proximal side of the hearing aid shell, the flexible filament extending outside the profile of the hearing aid shell, such that the filament interacts with a user's ear anatomy to determine an insertion depth of the hearing aid shell into the user's ear canal by preventing the hearing aid from being pushed too deep into the ear canal by the user, wherein the flexible filament provides a notch in the overall exterior shape of the top of the hearing aid projecting at an angle to a slide direction and projecting above the slide surface wherein the flexible filament defines an angle of about 105° relative to the slide surface.

12. The hearing aid of claim 11, wherein the outer surface of the hearing aid shell is dissimilar to the ear canal shape to provide openings between the hearing aid shell and the user's ear canal and thereby provide an unoccluded feel.

13. The hearing aid of claim 11, wherein the flexible filament comprises a cavum conchae portion for providing a primary biasing force to keep the hearing aid seated in the user's ear canal.

14. The hearing aid of claim 11, wherein the flexible filament comprises a lower depth setting bend for determining the insertion depth of a bottom of the hearing aid shell into the ear canal by contacting skin below the entrance to the ear canal and thereby preventing the bottom side of the hearing aid shell from being pushed too deep into the ear canal by the user.

15. The hearing aid of claim 11, wherein the flexible filament is selected from a kit of flexible filaments having different sizes.

16. The hearing aid of claim 11, wherein the flexible filament is shape retaining.

17. The hearing aid of claim 11, wherein the flexible filament comprises a first end attached to the hearing aid shell, a second end attached to the hearing aid shell, and a loop portion between the first end and the second end which loop portion extends away from the hearing aid shell.

18. The hearing aid of claim 17, wherein the flexible filament includes a portion in the shape of a horseshoe, with the first end and the second end attaching to the hearing aid shell at the same general height on the hearing aid shell.

19. The hearing aid of claim 18, wherein the flexible filament includes a portion in the shape of a ring attaching to the hearing aid at a first lower position and at a second higher position on a proximal side of the hearing aid shell.

20. The hearing aid of claim 17, wherein the flexible filament attaches to the hearing aid shell with a top clip and a bottom clip, each of the top clip and bottom clip being removable from the hearing aid shell for changing of the flexible filament.

21. The hearing aid of claim 20, provided as part of a kit, wherein the kit comprises a number of flexible filaments of different configurations each attachable to the hearing aid shell.

22. The hearing aid of claim 11, further comprising a biasing structure extending out of a proximal side of the hearing aid shell, the biasing structure having a free end which does not attach to the hearing aid shell.

* * * * *